(12) United States Patent
Kim

(10) Patent No.: US 9,298,590 B2
(45) Date of Patent: Mar. 29, 2016

(54) METHODS AND APPARATUSES FOR AUTOMATED TESTING OF STREAMING APPLICATIONS USING MAPREDUCE-LIKE MIDDLEWARE

(71) Applicant: GOOGLE INC., Mountain View, CA (US)

(72) Inventor: Keun Soo Kim, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/316,191

(22) Filed: Jun. 26, 2014

(65) Prior Publication Data

US 2015/0378872 A1    Dec. 31, 2015

(51) Int. Cl.
  *G06F 9/44* (2006.01)
  *G06F 11/36* (2006.01)
  *G06F 11/34* (2006.01)

(52) U.S. Cl.
  CPC ........ *G06F 11/3664* (2013.01); *G06F 11/3688* (2013.01); *G06F 11/3466* (2013.01); *G06F 2201/865* (2013.01)

(58) Field of Classification Search
  CPC ............ G06F 11/3688; G06F 11/3664; G06F 11/3684; G06F 9/44589; G06F 11/3466; G06F 2201/86
  See application file for complete search history.

(56) References Cited

U.S. PATENT DOCUMENTS

| | | | |
|---|---|---|---|
| 8,966,382 B1* | 2/2015 | Yehuda et al. | 715/762 |
| 2006/0195747 A1* | 8/2006 | Pramanick et al. | 714/742 |
| 2009/0254329 A1 | 10/2009 | Thakkar | |
| 2010/0100872 A1 | 4/2010 | Mitra | |
| 2011/0078227 A1* | 3/2011 | McAloon et al. | 709/201 |
| 2011/0276789 A1* | 11/2011 | Chambers et al. | 712/220 |
| 2011/0296382 A1 | 12/2011 | Pasternak | |
| 2011/0302583 A1* | 12/2011 | Abadi et al. | 718/102 |
| 2013/0124466 A1* | 5/2013 | Naidu et al. | 707/610 |

(Continued)

OTHER PUBLICATIONS

Chambers et al., "FlumeJava: Easy, Efficient Data-Parallel Pipelines", 2010 ACM, PLDI'10, Jun. 5-10, 2010, Toronto, Ontario, Canada, pp. 363-375; <http://dl.acm.org/results.cfm?h=1&cfid=560495869&cftoken=59024587>.*

(Continued)

*Primary Examiner* — Thuy Dao
*Assistant Examiner* — Ben C Wang
(74) *Attorney, Agent, or Firm* — Birch, Stewart, Kolasch & Birch, LLP

(57) ABSTRACT

A method for automated parallel testing of a software application using value replication is disclosed. An example embodiment may include marking at least one event in the software application with a primary marker that includes a primary marker label and a primary marker configuration value. The primary marker may be replicated to create a replicate marker that has a replicate marker label and a replicate configuration value. The replicate marker label and configuration value may be different from the primary marker label and configuration value. Parallel executions of the software application may be performed using the primary and replicate markers so that the software application is executed with both the primary and replicate marker configuration values. The disclosed middleware-level method transparently implements such replication of the output marker values. That is to make any MapReduce-style applications easily take advantage of output value replication.

19 Claims, 5 Drawing Sheets

(56) References Cited

U.S. PATENT DOCUMENTS

| | | | |
|---|---|---|---|
| 2014/0122546 A1* | 5/2014 | Liao et al. | 707/827 |
| 2014/0123115 A1* | 5/2014 | Peretz | 717/127 |
| 2014/0165135 A1* | 6/2014 | Fitterer et al. | 726/1 |
| 2014/0215487 A1* | 7/2014 | Cherkasova et al. | 718/106 |
| 2014/0317600 A1* | 10/2014 | Klunder et al. | 717/124 |
| 2015/0192909 A1* | 7/2015 | Archer et al. | 700/28 |

OTHER PUBLICATIONS

Chohan et al., "See spot run: using spot instances for mapreduce workflows", Jun. 22, 2010, USENIX Association, HotCloud'10 Proceedings of the 2nd USENIX conference on Hot topics in cloud computing, pp. 1-7; <https://www.usenix.org/legacy/events/hotcloud10/tech/full_papers/Chohan.pdf>.*

Jiang et al., "MAP-JOIN-REDUCE: Toward Scalable and Efficient Data Analysis on Large Clusters", 2011 IEEE, vol. 23, No. 9, Sep. 2011, pp. 1299-1311; <http://ieeexplore.ieee.org/stamp/stamp.jsp?tp=&arnumber=5674038>.*

International Search Report for corresponding application PCT/US2015/024647 dated Jul. 3, 2015.

* cited by examiner

```
/* file spam */

IsItSpam(received_email){

...

if (received_email.size > RECEIVED_EMAIL_THRESHOLD )
    received_email.sender.isSpammer() == TRUE
}
```

FIG. 1

```
/* file spam */

IsItSpam(received_email){
  ...
  if (received_email.size > ((RECEIVED_EMAIL_THRESHOLD.PRODUCTION, RECEIVED_EMAIL_THRESHOLD.TEST) )
       received_email.sender.isSpammer() == TRUE
  }
```

FIG. 2

METHODS AND APPARATUSES FOR AUTOMATED TESTING OF STREAMING APPLICATIONS USING MAPREDUCE-LIKE MIDDLEWARE

BACKGROUND

Software engineers work on software code functionality and try to ensure that any changes they make to software application code improves the software code and does not introduce problems into the software application. Therefore, software engineers extensively test and verify software code changes before allowing the changes to be executed live in a production version of the software application. The ability to verify and make new changes available to end users quickly is often considered important since software applications may need to be modified frequently in order to be most effective. For example, an anomaly detection application may need to update regularly to incorporate new anomaly definitions in order to successfully detect new versions of anomalies.

Since new anomaly attacks surface frequently and the traffic patterns of the existing attacks change on a daily basis, the ability to rapidly deploy and launch new anomaly classifications is critical to maximize the effectiveness and accuracy of the anomaly detection system. Similarly, many large-scale streaming applications have classification and labeling operators in their pipelines that need to be updated repeatedly. To create accurate classification and labeling operators, applications usually include aggregators which collect statistics about specific events and data over a long period of time, markers which label events, and mergers which merge marked events.

Customary development/testing processes include creating a developer testing framework to run a streaming application pipeline in an isolated environment, separate from the production environment. In this isolated environment, software code changes can be tested and verified. Any significant change to software code requires marking, merging, and aggregating data in the isolated environment. Testing changes in an isolated environment may take a long time because an aggregation process may need various windows of time of log files which contain recordings of the events that occur as an application is executing in order to accurately determine how the system, with new changes, is working. Once the changes have been verified, a software engineer may determine that the changes that will improve the software code's execution can be pushed to the testing or production environment. In addition to this process taking a long time, the process also requires a lot of resources since the production environmental setup needs to be duplicated in the development environment. Developmental testing also requires domain specific knowledge to operate the whole application pipeline in a development environment and parse the output data.

Another customary technique for testing is to create a test pipeline which may be a replica of the production pipeline. This testing pipeline may be used for stability and non-functional testing prior to pushing changes to production. As a result, the test pipeline is typically limited to pre-verified changes.

As recognized by the inventor, there needs to be a testing framework for assessing changes to a software application, specifically configuration parameter modifications that affect the application, which allows the changes to be quickly analyzed and verified so that the changes can easily be promoted to a production environment.

SUMMARY

This specification describes technologies relating to testing and verifying modifications to software applications in general, and specifically to systems and methods for automated testing of streaming applications using value replication.

In general, one aspect of the subject matter described in this specification can be embodied in a system and method for automated parallel testing of a software application using value replication. An example system includes one or more processing devices and one or more storage devices storing instructions that, when executed by the one or more processing devices cause the one or more processing devices to execute an example method. In one embodiment, an example system may include an application programming interface defining a map class, a reduce class, and at least one workflow class that accepts a definition a first instance of at least one marker identifying a first set of configuration data values and a first label and a definition of a second instance of the at least one marker identifying a second set of configuration data values and a second label.

An example method includes: marking at least one event in the software application with a primary marker that includes a primary marker label and a primary marker configuration value; replicating the primary marker to create a replicate marker that includes a replicate marker label, which is different from the primary marker label and a replicate marker configuration value which is different from the primary marker configuration value; and performing parallel executions of the software application using the primary and replicate markers such that the software application is executed with both the primary and the replicate marker configuration values.

A second example method includes: receiving software code including at least one map class, at least one reduce class, and at least one workflow class, the at least one workflow class including a first instance of at least one marker identifying a first set of configuration data values and a first label; defining a second instance of the at least one marker which includes a second set of configuration data values and a second label; determining whether value replica instantiation should be enabled; and responsive to determining that value replica instantiation should be enabled, instantiating the first and second instance of the at least one marker and performing parallel executions of the software application using the first and second instances of the at least one marker such that the software application is executed with both the first and second sets of configuration data values.

These and other embodiments can optionally include one or more of the following features: parallel executions of the software application may be performed using multiple sets of configuration values, results from each execution may be recorded, the results from each execution may be compared, and responsive to determining that a configuration value improves the execution of the software application, the configuration value may be promoted to the primary marker configuration value in a production or production-like environment; the configuration value may be provided statically, the configuration value may be provided dynamically at runtime; a plurality of primary markers and corresponding replicate markers may be provided for the software application; replicate marker configuration values may be enabled or disabled in a production or production-like environment on a per marker basis based on the comparison of results of executing the replicate markers with results of executing the primary markers; a primary marker and a replicate marker may represent weights, thresholds, classifications, or other application settings of a software application; results from executing the software application using the primary marker configuration value may be recorded separately from results from executing the software application using the replicate marker configuration value, the results may be compared, and if the replicate marker configuration value is determined to improve the software application's execution, the replicate marker may be promoted to the primary marker configuration value in a production or production-like environment; performing parallel executions of the software application using the primary and replicate markers may include simultaneously executing the software application using the primary and replicate marker configuration values in shared execution space; a first or second set of configuration data values may describe the locations of input and output data; determining whether value replica instantiation should be enabled is based on a flag or other indicator; defining a second instance of a marker may occur in a workflow class; defining a second instance of a marker may include using a special wrapper class that includes parameters for the marker class to be instantiated, first and second sets of configuration data values, and first and second labels; a wrapper class may instantiates two instances of a marker class and provide a different set of configuration data values to each instance; and a wrapper class may enable value replica instantiation based on a flag or other indicator.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1 is example code illustrating a conventional implementation of a marker.

FIG. 2 is example code illustrating an example implementation of testing configuration parameters, where one marker is executing and providing live results for a software application and the other marker is executing, but providing test results for the software application.

DETAILED DESCRIPTION

Figure 3:
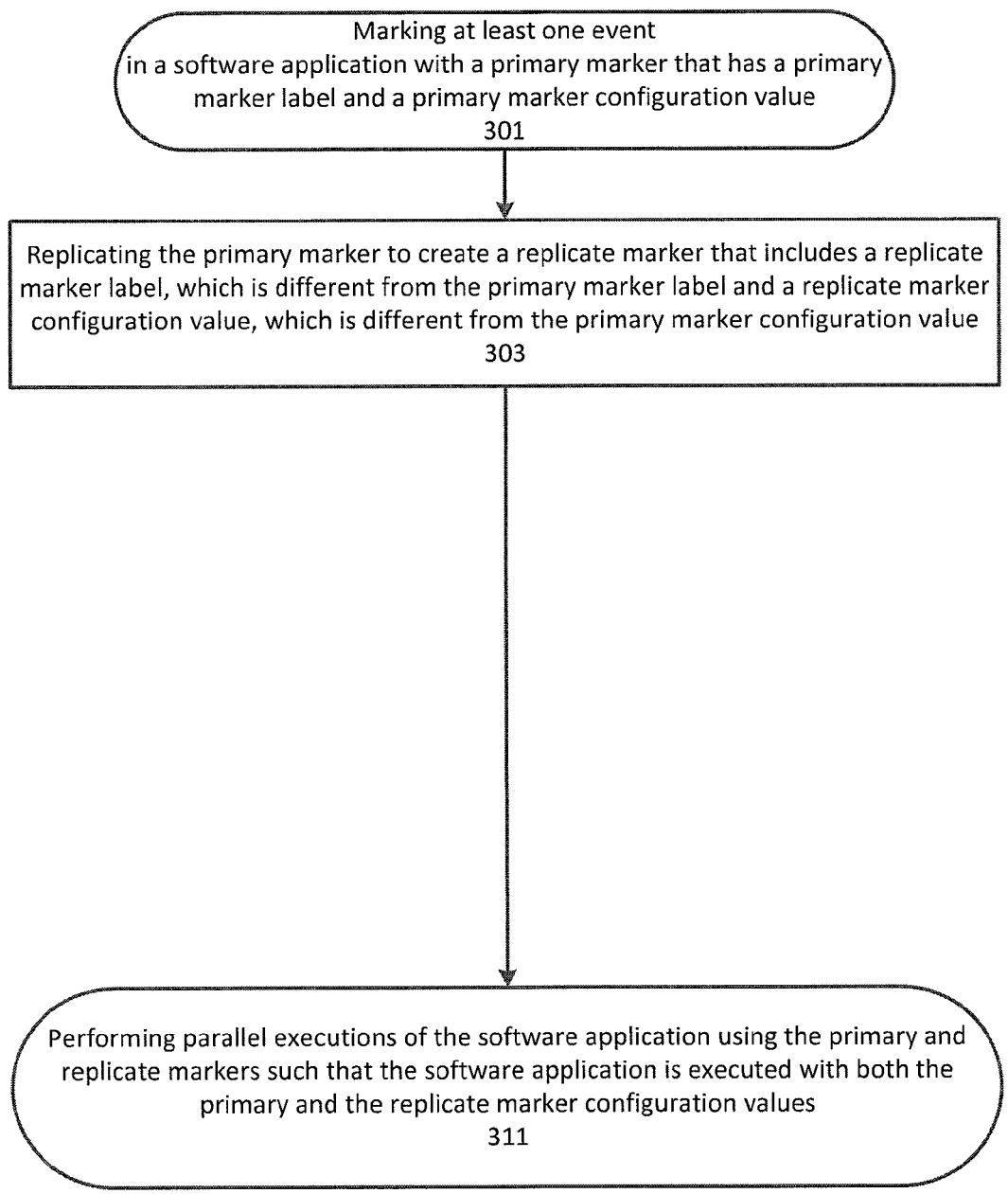
FIG. 3 is a flow diagram of an example method for automated testing of a software application using replicate markers simultaneously as primary markers.

According to an example embodiment, software application modifications may be tested and verified in a production or production-like environment without affecting production results or using additional resources by using value replication. Specifically, changes that are made to an application's configuration parameters such as weights, thresholds, classifications, or other application settings, may be tested in production or production-like environments by delineating the test configurations using particular markers that are distinct from the markers used by the production environment for live execution. For example, a software application may be created for anomaly detection. A function within the software application may contain code that checks the number of emails received from a particular sender in a specific time frame as illustrated in FIG. 1. If the number of emails received from the particular sender exceeds a given threshold, for example a RECEIVED_THRESHOLD, then the sender may be marked as a spammer. A RECEIVED_THRESHOLD may be a configurable parameter and may be set to any number. For example, the threshold may be set to 500 emails received in one minute. In addition to configuration changes, this example technique may also work for binary changes. If an application's middleware platform supports dynamic linking and modularized operators for example, testing binary changes may be more efficient using the example technique than traditional testing methods.

As discussed above, changes to the software code, including configuration parameters, may need to occur quickly. However, changes still need to be thoroughly tested before they are pushed to the production environment for execution. In an example embodiment, markers which label selected events may be replicated. For example, as illustrated in FIG. 2, there may be a marker for the event of the received email size being greater than a threshold. This marker may be replicated for testing purposes. The threshold in the production environment may be set to 500 emails received in one minute as discussed above. However, a new configuration parameter may be tested at the same time the code is run in the production or production-like environment. The new configuration parameter may set the threshold to 200 emails received in one minute.

Replicated markers may use different configurations and labels as illustrated in FIG. 2. Alternatively, the replicated markers may be configured to consume multiple sets of configurations and have different labels for each set. The configurations may be provided statically or dynamically at runtime via some shared data storage or direct/indirect communications. For example, configurations can be sent to the runtime system using a database (e.g. SQL-like or structured data), a file system (e.g. local or network file systems), or a direct communication (e.g. Remote Procedure Call (RPC) or standard network protocols) This replication may be done in a production environment, a testing environment, or both a testing and a production environment.

Figure 5:
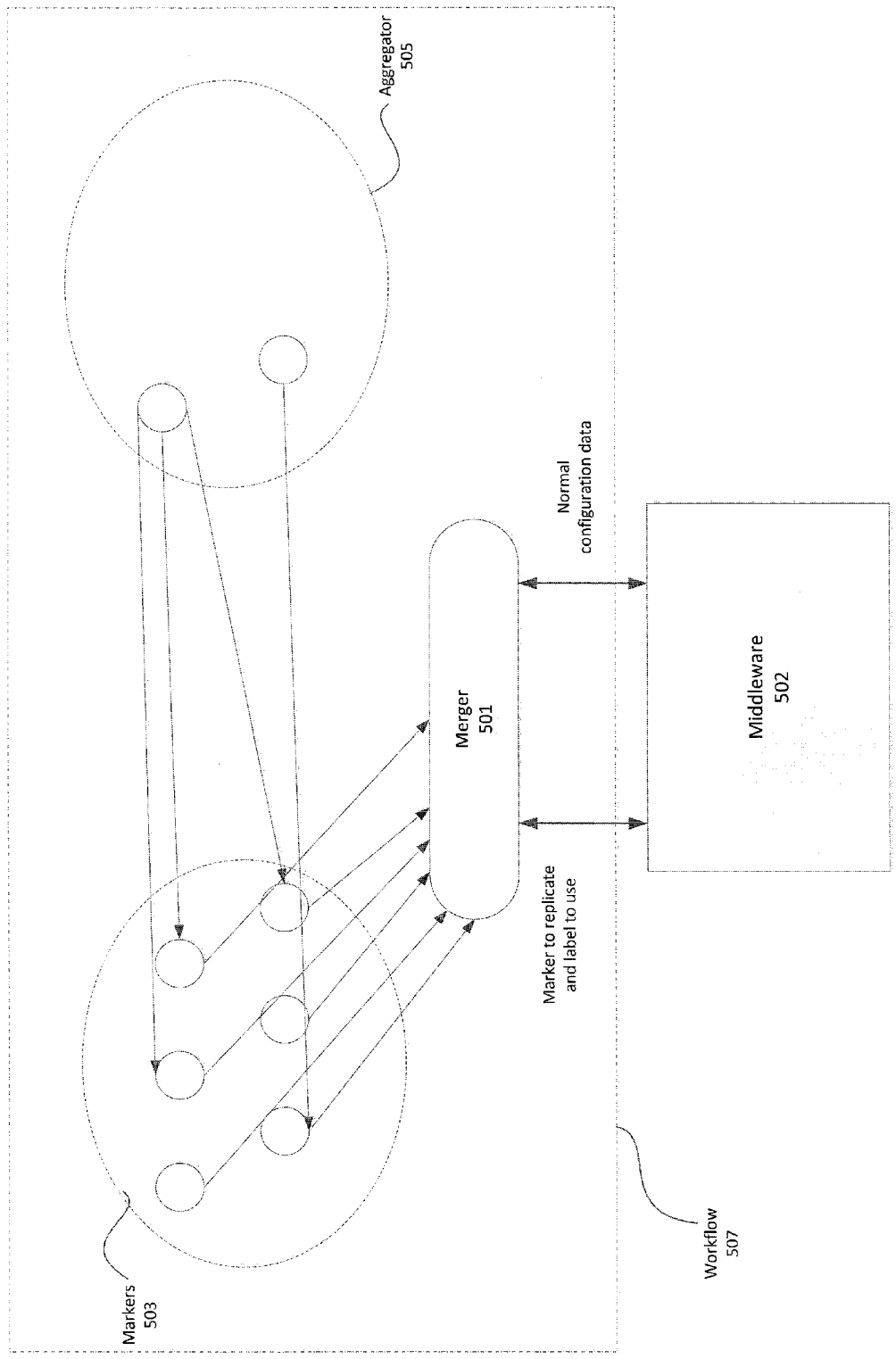
FIG. 5 is a block diagram illustrating an example embodiment.

As illustrated in FIG. 5, operators such as aggregators, markers, and merges may form a directed acyclical graph on top of a software application's middleware. The middleware may be provided with normal configuration data of the operators or markers can be replicated with different labels.

Replication of markers allows multiple markers to be set for a given configuration parameter. Therefore the given parameter may be run with several different configuration values simultaneously. As discussed above, a production configuration for RECEIVED_THRESHOLD may be 500 emails per minute, but a test configuration may be 200 emails per minute. A production environment may run the software code with both configuration parameters simultaneously using different markers to delineate the two events, one reaching a threshold at 500 emails and the other reaching the threshold at 200 emails. Events recorded using the production parameter/marker could be stored separately from the events recorded using the test parameter/marker. There may be a flag or some other indicator that is set for test and/or production markers so that test results go to a certain location and production results go to a different location. Additionally or alternatively there may be a flag/indicator that describes the exact path to store the output data. This type of flag/indicator may be part of each configuration data/file. Therefore, the test marker events may not affect the production code, but may provide accurate data to assess and verify the test configuration in order for a software developer to decide whether the test configuration should be promoted to production.

There may be multiple sets of configuration values for a specific parameter, which may be run simultaneously in a production or production-like system along with production or production-like configuration values. For example, there may be a development value, a test value, and a production value all set for one parameter. The code results from using each value may be stored in separate locations so that a software engineer can determine the optimal configuration value by comparing the different results. In this case, there may be three sets of results, one for development, one for test, and one for production. Each configuration change may be enabled or disabled depending on the results and whether the change improves the functionality of the software application.

In a software application there may be several different places in software code where markers are used. Each marker may be replicated so that configuration value changes may be tested. Changes may be enabled or disabled a production environment on a per marker basis. Software modifications that improve the software code may be quickly promoted to the production environment while other changes may be adjusted in order to continually test and improve the configuration parameters in order to optimize the software code.

An example process begins with marking at least one event in the software application with a primary marker that has a primary marker label and a primary marker configuration value as illustrated in FIG. 3 (301). The primary marker may be replicated to create a replicate marker that may be used to assess test configuration values. The replicate marker may have a replicate marker label that is different from the primary marker label. The replicate marker may also have a replicate marker configuration value that is different from the primary marker configuration value (303). Parallel executions of the software application may be performed using the primary and replicate markers so that the software application is executed with both the primary and the replicate marker configuration values (311). A flag or indicator may be set to store the results of executing the software application with the primary marker separately from the results of executing the software application with the replicated marker. There are many ways to aggregate results depending the particular application being executed. For example, one way to aggregate is simply to count marked events of each label. This counting may be done by using a MapReduce-like job. Aggregation may also be done by identifying the similarities and differences among events filtered by the original and replicated marker labels. The results from executing using the primary marker configuration value may be recorded as well as the results from executing using the replicate marker configuration value. The results may be compared with each other and if the results of executing the software application with the replicate marker improve the software application's execution over using the primary marker, the replicate marker may be promoted to the primary marker in a production or a production-like environment. Determining that configuration changes or binary changes improve the software code may be domain specific and often includes manual operations.

Aspects of the invention may be provided for MapReduce-style middleware (e.g., MapReduce, Hadoop) or higher-level streaming application middleware based on MapReduce-style middleware. The source code of a program on such middleware may have a mapper class (for aggregation), a reducer class (for marking or merging), and a workflow class. There may be a hierarchy of workflow classes, with the top-level workflow class describing data dependencies between the map and reduce jobs. The definition of such classes may be the same as other class definitions in a given programming language (e.g., C++ or Java). These MapReduce-style classes may also be implemented as modules or components if a special-purpose programming language is supported by the middleware. Each workflow class may describe ways to instantiate job classes (e.g., mapper and reducer) by describing the ways to generate and send configuration data to each mapreduce job. The configuration data may describe the locations of input and output data and may contain information about the marker label to use in case a job is for a marker. Optionally, the output data location may be decided based on a marker label (e.g., to use different output storages). Users may only need to provide replicate marker labels and optionally configuration data to the middleware. The middleware may replicate and execute the markers in parallel using different marker labels and configuration data.

In one embodiment of the present invention, two instances for each of the selected marker (e.g., reducer) classes may be specified in a workflow class. Different configuration data may be provided to each instance of the selected marker class. The second instance may be activated optionally if some flag or other indicator is set (e.g., a flag indicating whether it is a test system or that the software application should be run in a test mode when tests should be performed).

Another embodiment may use a special wrapper class to describe the instantiation of a selected marker class. The wrapper class may instantiate two instances of the marker class and provide different configuration data to each instance. In order to instantiate two instances of the marker class, the wrapper class may include parameters for the selected marker class to be instantiated, the original and replicated configuration data values, and the original and replicated labels. The wrapper can conditionally enable value replica instantiation when some flag or other indicator is set. There are many other possible ways to implement the presented techniques (e.g., using language primitives, abstraction using data passed to the middleware or the job classes) and the disclosed embodiments are merely examples of the general concept of value replication.

Figure 4:
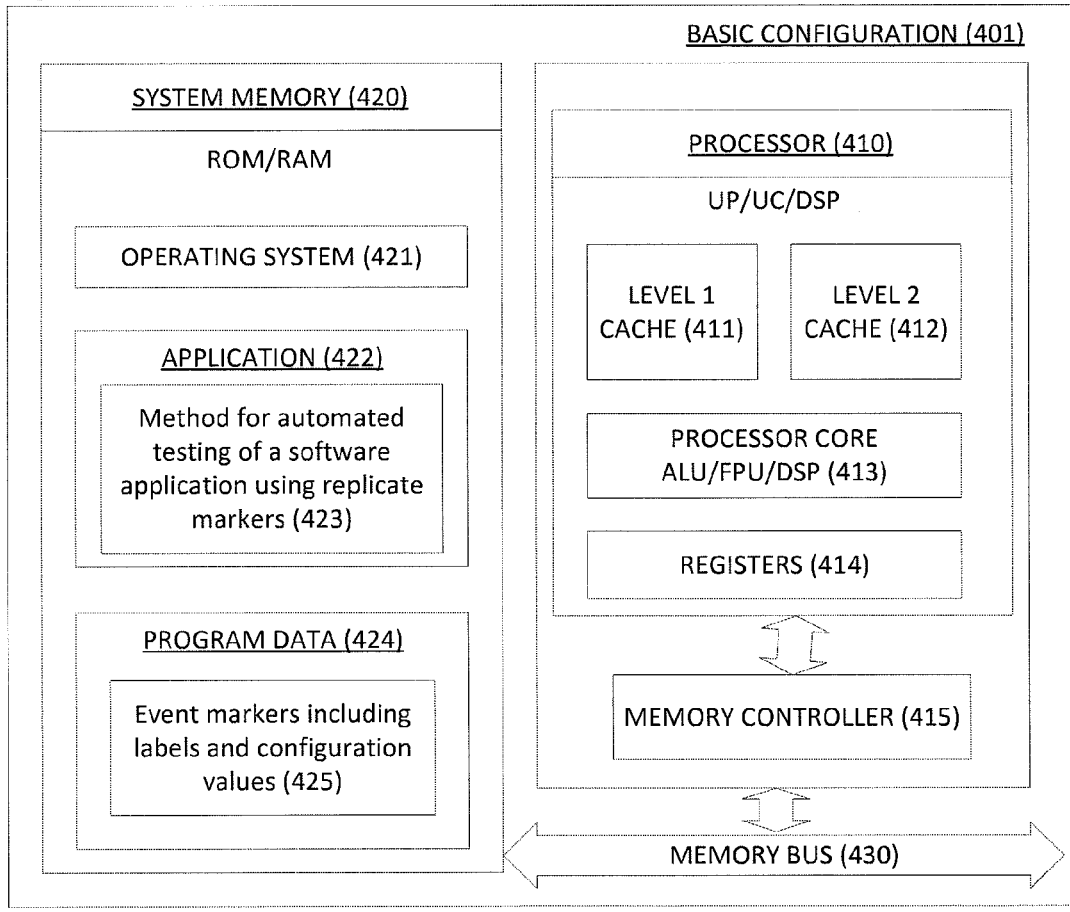
FIG. 4 is a block diagram illustrating an example computing device.

FIG. 4 is a high-level block diagram of an example computer (400) that is arranged for automating testing of a software application using replicate markers. In a very basic configuration (401), the computing device (400) typically includes one or more processors (410) and system memory (420). A memory bus (430) can be used for communicating between the processor (410) and the system memory (420).

Depending on the desired configuration, the processor (410) can be of any type including but not limited to a microprocessor (µP), a microcontroller (µC), a digital signal processor (DSP), or any combination thereof. The processor (410) can include one more levels of caching, such as a level one cache (411) and a level two cache (412), a processor core (413), and registers (414). The processor core (413) can include an arithmetic logic unit (ALU), a floating point unit (FPU), a digital signal processing core (DSP Core), or any combination thereof. A memory controller (416) can also be used with the processor (410), or in some implementations the memory controller (415) can be an internal part of the processor (410).

Depending on the desired configuration, the system memory (420) can be of any type including but not limited to volatile memory (such as RAM), non-volatile memory (such as ROM, flash memory, etc.) or any combination thereof. System memory (420) typically includes an operating system (421), one or more applications (422), and program data (424). The application (422) may include a method for automating testing of a software application using replicate markers. Program Data (424) includes storing instructions that, when executed by the one or more processing devices, implement a system and method for automating testing of a software application using replicate markers as well as configuration values and labels for markers. (423). In some embodiments, the application (422) can be arranged to operate with program data (424) on an operating system (421).

The computing device (400) can have additional features or functionality, and additional interfaces to facilitate communications between the basic configuration (401) and any required devices and interfaces.

System memory (420) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of the device (400).

The computing device (400) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (400) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for automated parallel testing of a software application using value replication, the method comprising:
    an application programming interface defining a map class, a reduce class, and at least one workflow class that accepts a definition a first instance of at least one marker identifying a first set of configuration data values and a first label and a definition of a second instance of the at least one marker identifying a second set of configuration data values and a second label;
    receiving software code written using the application programming interface, the code including at least one workflow class, the at least one workflow class including a first instance of at least one marker identifying a first set of configuration data values and a first label;
    defining a second instance of the at least one marker which includes a second set of configuration data values and a second label;
    determining whether value replica instantiation should be enabled; and
    responsive to determining that value replica instantiation should be enabled, instantiating the first and second instance of the at least one marker and performing parallel executions of the software application using the first and second instances of the at least one marker such that the software application is executed with both the first and second sets of configuration data values.

2. The computer-implemented method of claim 1, wherein the first or second set of configuration data values describes the locations of input and output data.

3. The computer-implemented method of claim 1, wherein determining whether value replica instantiation should be enabled is based on a flag or other indicator.

4. The computer-implemented method of claim 1, wherein defining a second instance of the at least one marker occurs in the at least one workflow class.

5. The computer-implemented method of claim 1, wherein defining a second instance of the at least one marker further comprises using a special wrapper class that includes parameters for the at least one marker class to be instantiated, the first and second sets of configuration data values, and the first and second labels.

6. The computer-implemented method of claim 5, wherein the wrapper class instantiates the two instances of the at least one marker class and provides a different set of configuration data values to each instance.

7. The computer-implemented method of claim 1, further comprising:
    recording results from executing the software application using the first instance separately from the results from executing the software application using the second instance:
    comparing the results from executing the software application using the first and second instances: and responsive to the second instance results being determined to improve the software application's execution, promoting the second instance's set of configuration data values to a production or production-like environment.

8. The computer-implemented method of claim 1, wherein performing parallel executions of the software application using the first and second instances includes simultaneously executing the software application using the first and second sets of configuration data values in shared execution space.

9. The computer-implemented method of claim 1, further comprising enabling or disabling second instance configuration data values in a production or production-like environment on a per marker basis based on a comparison of results of executing the second instance with results of executing the first instance.

10. The computer-implemented method of claim 1, wherein responsive to determining that value replica instantiation should not be enabled, instantiating only the first instance of the at least one marker and performing execution of the software application using the first instance of the at least one marker such that the software application is executed with the first set of configuration data values.

11. A system for automated parallel testing of a software application using value replication, the system comprising:
    an application programming interface defining a map class, a reduce class, and at least one workflow class that accepts a definition a first instance of at least one marker identifying a first set of configuration data values and a first label and a definition of a second instance of the at least one marker identifying a second set of configuration data values and a second label;
    one or more processing devices; and
    one or more storage devices storing instructions that, when executed by the one or more processing devices, cause the one or more processing devices to:
    receive software code including code written using the application programming interface, the code including at least one workflow class with a definition of a first instance of at least one marker identifying a first set of configuration data values and a first label and a definition of a second instance of the at least one marker identifying a second set of configuration data values and a second label;
    determine whether value replica instantiation should be enabled: and
    responsive to determining that value replica instantiation should be enabled, instantiate the first and second instance of the at least one marker and perform parallel executions of the software application using the first and second instances of the at least one marker such that the software application is executed with both the first and second sets of configuration data values.

12. The system of claim 11, wherein the first or second set of configuration data values describes the locations of input and output data.

13. The system of claim 11, wherein determining whether value replica instantiation should be enabled is based on a flag or other indicator.

14. The system of claim 11, wherein defining a second instance of the at least one marker further comprises using a special wrapper class that includes parameters for the at least one marker class to be instantiated, the first and second sets of configuration data values, and the first and second labels.

15. The system of claim 14, wherein the wrapper class instantiates the two instances of the at least one marker class and provides a different set of configuration data values to each instance.

16. The system of claim 11, the one or more processing devices further instructed to:
    record results from executing the software application using the first instance separately from the results from executing the software application using the second instance;
    compare the results from executing the software application using the first and second instances; and
    responsive to the second instance results being determined to improve the software application's execution, promote the second instance's set of configuration data values to a production or production-like environment.

17. The system of claim 11, wherein performing parallel executions of the software application using the first and second instances includes simultaneously executing the software application using the first and second sets of configuration data values in shared execution space.

18. The system of claim 11, the one or more processing devices further instructed to:
    enable or disable second instance configuration data values in a production or production-like environment on a per marker basis based on a comparison of results of executing the second instance with results of executing the first instance.

19. The system of claim 11, wherein responsive to determining that value replica instantiation should not be enabled, instantiating only the first instance of the at least one marker and performing execution of the software application using the first instance of the at least one marker such that the software application is executed with the first set of configuration data values.

* * * * *

UNITED STATES PATENT AND TRADEMARK OFFICE
CERTIFICATE OF CORRECTION

Page 1 of 1

PATENT NO. : 9,298,590 B2
APPLICATION NO. : 14/316191
DATED : March 29, 2016
INVENTOR(S) : Keun Soo Yim It is certified that error appears in the above-identified patent and that said Letters Patent is hereby corrected as shown below:

ON THE TITLE PAGE

Item (72) reads "Inventor: Keun Soo Kim, Mountain View, CA (US)" should read

-- Inventor: Keun Soo Yim, Mountain View, CA (US) --

Signed and Sealed this
Thirty-first Day of May, 2016

Michelle K. Lee
*Director of the United States Patent and Trademark Office*